United States Patent Office 3,712,882
Patented Jan. 23, 1973

3,712,882
ORANGE TO RUBINE DISPERSE DISAZO DYES
John Blackwell, Kennett Square, Pa., and Jeanne K. Bauxbaum, Wilmington, Del., assignors to E. I. du Pont de Nemours and Company, Wilmington, Del.
No Drawing. Filed Nov. 6, 1969, Ser. No. 874,722
Int. Cl. C09b 31/04; D06p 1/18, 3/36
U.S. Cl. 260—187  5 Claims

ABSTRACT OF THE DISCLOSURE

Orange to rubine disperse disazo dyes, useful for dyeing water swellable cellulosic or synthetic fibers or blends or mixtures thereof, having the formula

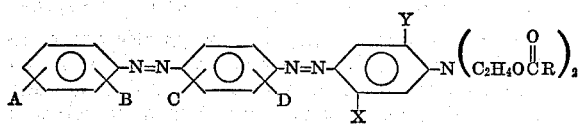

wherein

R is phenyl or phenyl with up to two substituents selected from $C_{1-4}$ alkyl, $C_{1-4}$ alkoxy, $NO_2$ and Cl;
X is H, Cl, $C_{1-4}$ alkyl

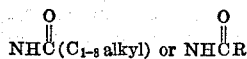

wherein R is as defined above;
Y is H, $C_{1-4}$ alkyl or $C_{1-4}$ alkoxy;
A is H, Cl, Br or $C_{1-4}$ alkyl;
B is H, Cl, Br, $CF_3$, CN, $C_{1-4}$ alkyl,

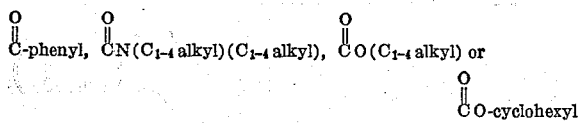

C and D jointly are CH=CH—CH=CH or C is H, $C_{1-2}$ alkyl or $C_{1-2}$ alkoxy and D is H, Cl, $C_{1-2}$ alkyl or $C_{1-2}$ alkoxy.

BACKGROUND OF THE INVENTION

(1) Field of the invention

This invention relates to water-insoluble disazo dyes which have utility in the dyeing of a broad spectrum of synthetic and natural materials, especially water swellable cellulosic materials, or mixtures or blends of such synthetic and natural materials.

(2) Description of the prior art

It is well known in the art that synthetic fibers, for example, fibers prepared from polyesters, polyamides or cellulose acetate, can be dyed with a wide variety of disperse dyes whose solubilities in water vary from very low to moderately high.

Natural fibers such as water swellable cellulosic fibers, especially cotton, are dyed by processes, and with dyes, which usually differ markedly from the processes and dyes employed with synthetic fibers. The conventional methods for dyeing water swellable cellulosic materials may be summarized as follows:

(1) A high molecular weight water insoluble dye is formed within the material, either by reacting two smaller components, as in the formation of an azoic dye by a coupling reaction, or by a chemical reaction which renders insoluble a soluble dye precursor, as in vat and mordant dyeing.

(2) A water soluble preformed dye having an affinity for the cellulosic material is exhausted onto the material from an aqueous solution by a procedure which involves reducing the solubility of the dye in the aqueous solution, as with direct dyes.

(3) A dye containing a substituent which reacts with the cellulose or a modified cellulose is exhausted onto the material from either an aqueous or non-aqueous solution under conditions such that the dye is chemically bonded to the substrate, as with fiber reactive dyes.

(4) Water insoluble pigments are bonded to the cellulose with polymeric materials, as in pigment printing.

(5) A finely divided form of a water insoluble dye is incorporated into the cellulose during a manufacturing step, as is sometimes done during spinning of viscose rayon.

None of these conventional procedures can be used to dye water swellable cellulose by directly introducing into the material a preformed, nonreactive, water insoluble dye since such dyes have little natural affinity for or substantivity to such cellulosic materials.

Representative of the aforesaid processes wherein dyes are formed in situ after a precursor is deposited on or within the cellulose are processes disclosed in U.S. Pats. 396,692 and 2,069,215 and British Pat. 1,071,074. A process employing water soluble preformed dyes for dyeing cellulose is discussed in the Journal of the Society of Dyers and Colourists, 73, 23 (1957).

The aforesaid processes suffer from a variety of disadvantages, such as complexity of application, inability to achieve a broad spectrum of colors, and low fastness of the dyed cellulose to aqueous washing and/or dry-cleaning with organic solvents.

The use of dyes of low water solubility for dyeing cotton is disclosed in British Pat. 1,112,279. The process involves the application of dye, water and urea or a structurally related compound to the substrate, followed by heating. In such a process dye utilization frequently is poor and undesirable basic degradation products from the urea or related compound may be formed.

Problems in addition to the above are encountered in the use of prior art dyes and dyeing processes for blends or mixtures of water swellable cellulosic and synthetic materials. Generally, complex two-stage processes are required and the components of the blend or mixture are dyed in separate steps with different dyes. Cross-staining may result and the amounts of dyes required usually are high, with each component undesirably interfering with the dyeing of the other. When cross-staining occurs, the dye must be capable of being scoured off the stained component. Even under optimum conditions, however, shade match on both components of the blend is difficult to achieve. The complexity of the two-stage process for dyeing blends also is apparent from a consideration of the divergency of operating conditions between conventional dyeing processes for cellulosic and for synthetic materials. In contrast to the aforesaid procedures for dyeing water swellable cellulose, the usual procedures for dyeing synthetic materials are based on dissolution of water insoluble dyes in the synthetic material.

Representative of prior art on the dyeing of blends of cellulosic and synthetic materials employing a two-stage process is U.S. Pat. 3,313,590. Analogous to the dyeing of such blends and confirming the aforesaid distinction between water swellable cellulosic materials and nonswellable cellulose acetate, U.S. Pat. 3,153,563 discloses a two-stage process wherein the cellulose acetate is dyed with a water insoluble dye without coloring the cellulose which then is dyed in an independent step.

The swelling of cotton fibers and other similar cellulosic materials by water has long been known. Swelling usually is rapid upon contact with water, but it is facilitated by wetting agents and by heat. The swollen materials are enlarged, more flexible, reduced in strength, and otherwise modified in physical and mechanical properties. Because of their open structure, swollen cellulosic materials can be penetrated by and reacted with low molecular weight water soluble compounds. Valko and Limdi in the Textile Research Journal, 32, 331–337 (1962) report that cotton can be swollen with water containing both high boiling, water soluble, nonreactive compounds of limited molecular weight and a crosslinking agent. The water can be removed with retention of swelling and crosslinking can then be effected. The authors suggest that the technique may be useful not only for the introduction into cotton of water soluble reactive materials (crosslinking agents) but also other reactive materials which are insoluble in water but soluble in said high boiling, water soluble, nonreactive compound. A similar technique is described in U.S. Pat. 2,339,913 issued Jan. 25, 1944 to Hanford and Holmes. The cellulosic is swollen with water, the water then is replaced with methanol-benzene and finally with benzene, with retention of swelling. A cellulose-reactive material (crosslinking agent) is added as a benzene solution and crosslinking is effected.

Blackwell, Gumprecht and Starn in commonly assigned, pending, U.S. application Ser. No. 778,809 filed Nov. 25, 1968, and now abandoned, disclose a process for dyeing water swellable cellulosic materials with disperse dyes, which process comprises contacting a water swellable cellulosic material in any sequence with the following:

(1) Water in an amount sufficient to swell the cellulose;

(2) A dye in an amount sufficient to color the cellulose, a boiling saturated solution of which dye in 0.1 molar aqueous sodium carbonate exhibits an optical absorbance not in excess of about 30; and (3) A solvent in an amount sufficient to maintain swelling of the cellulose if water is removed, and which
(a) is at least 2.5 weight percent soluble in water at 25° C.,
(b) boils above about 150° C. at atmospheric pressure,
(c) is a solvent for the dye at some temperature in the range of about 0° to 225° C., and
(d) has the formula

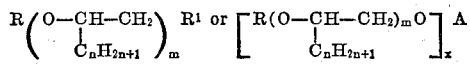

wherein $n$ is 0 or 1;
$m$ is a positive whole number;
R is H, $C_{1-8}$ alkyl, $C_{7-15}$ aralkyl or alkaryl,

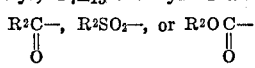

wherein $R^2$ is $C_{1-8}$ alkyl, $C_{5-10}$ cycloalkyl, $C_{7-15}$ aralkyl or alkaryl, $C_6$ aryl, $C_{10}$ aryl, or furfuryl;
$R^1$ is —OH, —$OR^2$, —$SR^2$, —$NHR^2$, —$NR^2$ ($C_{1-8}$ alkyl), —$NR^2(C_{7-15}$ aralkyl or alkaryl),
—OCR², —OS₂R², —OCR², —NH(phenyl), or —NH(naphthyl)

$x$ is the number of unsatisfied valencies in A; and A is ROCH₂CHORCH₂—, —CH₂CHORCH₂—,

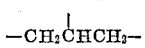

—CH₂C(CH₂OR)₃, (—CH₂)₂C(CH₂OR)₂, (—CH₂)₃CCH₂OR (—CH₂)₄C, —CH₂(CHOR)ᵧCH₂OR,

—CH₂(CHOR)ᵧCH₂— or —CH₂(CHOR)ᵧ₋ᵤ(—CH)ᵤCH₂— in which y is 2, 3, or 4 and
z is 0, 1, 2, 3, or 4 but no greater than $y$;

provided that at some stage during the process the interior of the swollen cellulose is contacted with a solution of the dye in aqueous solvent or solvent.

Particular embodiments of the aforesaid process include those wherein said solution is formed within and/or outside the swollen cellulose and those wherein solution of dye in aqueous dye solvent or dye solvent is achieved by means of heat, by reducing the proportion of water to dye solvent, or by adding an auxiliary solvent. Embodiments of the process also include dyeing at elevated temperatures.

Still other embodiments of the aforesaid process include the dyeing of blends or mixtures of cellulosic and synthetic materials, such as polyamide or polyester, with the same dye. In such a process the cellulose is dyed as described above and the synthetic material is dyed either at the same time or in an independent step of the process.

OBJECTS AND SUMMARY OF THE INVENTION

It is an object of this invention to provide orange to rubine disperse disazo dyes which are useful in the above-described process of Blackwell et al. for dyeing water swellable cellulosic materials and blends or mixtures thereof with synthetic materials. It is a further object to provide dyes which give a good balance of shade when used to dye the aforesaid blends or mixtures. Another object is to provide disperse dyes which exhibit good fastness to light, washing, crocking and sublimation when applied to water swellable cellulosic materials, synthetic materials or blends or mixtures of such cellulosic and synthetic materials. Still another object is to provide disperse disazo dyes which are useful for dyeing synthetic materials by conventional procedures.

The present invention resides in orange to rubine disperse disazo dyes of the formula

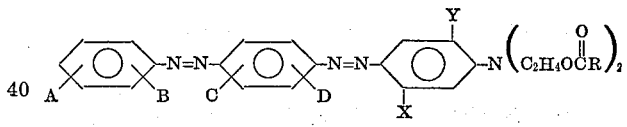

wherein

R is phenyl or phenyl with up to two substituents selected from $C_{1-4}$ alkyl, $C_{1-4}$ alkoxy, NO₂ and Cl;
X is H, Cl, $C_{1-4}$ alkyl,

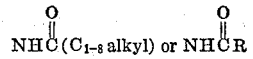

wherein R is as defined above;

Y is H, $C_{1-4}$ alkyl or $C_{1-4}$ alkoxy;
A is H, Cl, Br or $C_{1-4}$ alkyl;
B is H, Cl, Br, CF₁, CN, $C_{1-4}$ alkyl, C-phenyl, CN($C_{1-4}$ alkyl)($C_{1-4}$alkyl), CO($C_{1-4}$ alkyl) or CO-cyclohexyl C and D jointly are C=CH—CH=CH or C is H, $C_{1-2}$ alkyl or $C_{1-2}$ alkoxy and D is H, Cl, $C_{1-2}$ alkyl or $C_{1-2}$ alkoxy.

DETAILED DESCRIPTION OF THE INVENTION

The orange to rubine disperse disazo dyes of this invention are prepared by diazotizing an amine of the formula

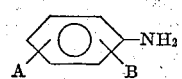

and coupling the diazo to an amine of the formula

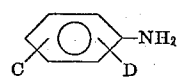

The monoazo intermediate thus formed is diazotized and coupled to an amine of the formula

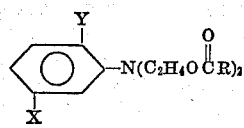

In the above formulas, all symbols are as previously defined. All diazotizations and couplings are carried out using conventional prior art procedures.

The first aromatic amine can be diazotized, as customery, in cold aqueous hydrochloric acid. Examples of such aromatic amines which are readily diazotized are given in Table 1.

TABLE 1

| | |
|---|---|
| Aniline | 2-bromo-4-methylaniline. |
| o-, m- or p-Chloroaniline | 2-chloro-4-methylaniline. |
| o-, m- or p-Bromoaniline | 2-chloro-6-methylaniline. |
| o-, m- or p-Toluidine | 3-chloro-2-methylaniline. |
| o-, m- or p-Ethylaniline | 3-chloro-4-methylaniline. |
| 2,3-xylidine | 4-chloro-2-methylaniline. |
| 2,4-xylidine | 5-chloro-2-methylaniline. |
| 2,5-xylidine | o- or p-Cyanoaniline. |
| 2,6-xylidine | o-Aminobenzotrifluoride. |
| 3,4-xylidine | Butyl anthranilate. |
| 3,5-xylidine | Methyl-4-chloroanthranilate. |
| 4-n-butylaniline | p-Aminobenzoic acid, N,N-dibutylamide. |
| 2,4-dichloroaniline | |
| 2,5-dibromoaniline | p-Aminobenzophenone. |
| Do | 5-amino-2-bromobenzotrifluoride. |
| 3,4-dichloroaniline | m-Aminobenzoic acid, dimethylamide. |
| 3,5-dichloroaniline | m-Aminobenzoic acid, cyclohexyl ester. |

In coupling the diazotized aromatic amine to the second aromatic amine, examples of which are given in Table 2, the latter can be dissolved in dilute aqueous hydrochloric acid and admixed with, by adding thereto or by adding to it, the previously described diazotized aromatic amine. The pH is raised with a suitable salt or base, such as sodium acetate or sodium hydroxide, to precipitate the free base. The product is isolated by filtration.

TABLE 2

| | |
|---|---|
| Aniline | 2,5-dimethoxyaniline. |
| m-Chloroaniline | 2-methoxy-5-methylaniline. |
| o- or m-Toluidine | 2,5-xylidine. |
| o- or m-Anisidine | 2,6-xylidine. |
| o- or m-Ethylaniline | α-Naphthylamine. |
| o- or m-Phenetidine | |

The monoazo intermediate product can be diazotized conveniently in aqueous acetic acid at 10–30° C. with hydrochloric acid and sodium nitrite. Coupling of the diazonium salt and the desired coupler, examples of which are given in Table 3, in a suitable solvent, such as acetic acid or acetone, produces the disazo dye. As before, the admixing of the coupling reactants can be in either direction.

TABLE 3

| X | Y | R |
|---|---|---|
| H | H | $C_6H_5$ |
| Cl | H | $C_6H_5$ |
| $CH_3$ | H | $C_6H_5$ |
| $NHCOCH_3$ | H | $C_6H_5$ |
| $NHCOC_6H_5$ | H | $C_6H_5$ |
| $NHCOCH_3$ | $OCH_3$ | $C_6H_5$ |
| $NHCOC_6H_5$ | $OCH_3$ | $C_6H_5$ |
| $CH_3$ | $OCH_3$ | $C_6H_5$ |
| $CH_3$ | $CH_3$ | $C_6H_5$ |
| $NHCOCH_3$ | $C_4H_9$ | $C_6H_5$ |
| $NHCOC_6H_5$ | $OC_4H_9$ | $C_6H_5$ |
| NHCO—⟨C₆H₄⟩—t.butyl | H | $C_6H_5$ |
| NHCO—⟨C₆H₃(CH₃)₂⟩ | H | $C_6H_5$ |
| NHCO—⟨C₆H₄⟩—NO₂ | H | $C_6H_5$ |
| NHCO—⟨C₆H₃(OCH₃)₂⟩ | H | $C_6H_5$ |
| NHCO-n-octyl | H | $C_6H_5$ |
| $CH_3$ | H | —⟨C₆H₄⟩—$OC_2H_5$ |
| H | H | —⟨C₆H₄⟩—t.butyl |
| H | H | —⟨C₆H₄⟩—Cl |
| NHCO—⟨C₆H₄⟩—$OC_4H_9$ | H | —⟨C₆H₄⟩—$NO_2$ |

It is often desirable to raise the pH during the coupling procedure to increase the rate of reaction. This is done by adding a suitable salt or base, such as sodium acetate or sodium hydroxide. The product dyes are isolated by filtration and purified, if necessary, by washing, reslurrying, or recrystallizing from a suitable solvent system. Finally, the dye is milled in the presence of a dispersing agent, such as a sodium lignosulfonate, until a particle size of about 1 micron is obtained.

The method described above for preparing the dyes of this invention involves the isolation and reslurrying of the monoazo intermediate. This time-consuming step can be avoided by providing a reaction medium in which the monoazo intermediate is sufficiently soluble to undergo diazotization as soon as it is formed, without prior isolation. Exemplifying this method: acetic acid is added to the monoazo intermediate in situ, instead of raising the pH of the reaction mixture to precipitate the free base; sodium nitrite then is added (for diazotization), followed by a solution of the coupler in acetic acid; the disazo dye results.

The cellulosic materials which can be dyed with the dyes of this invention by the previously described Blackwell et al. process include all forms of cellulose which increase in size and in flexibility upon exposure to water. Suitable materials include natural fibers and purified wood pulps as well as reconstituted cellulose in fiber and film form. Cotton fibers can be dyed in any of the forms in which they are conventionally used in textile materials and after any of the treatments conventionally used to prepare them for dyeing. Also included is cotton which has been treated in any way which does not significantly reduce its swelling upon heating with water; raw or scoured cotton and cotton which has been mercerized or otherwise preshrunk are dyeable with the dyes of this invention. Reconstituted cellulosic fibers which are sufficiently open in structure so that they are swollen by water and penetrated by a dye solvent are dyeable, for example, cuprammonium rayon. Xanthate viscose rayon normally has a structure which is more difficult to swell and may require exposure to dye, water, and dye solvent for somewhat longer times at lower temperatures. Dyeing of viscose rayon fabric is promoted by the presence of wetting agents, preferably of the nonionic type, which assist penetration of the fibers by the dye solvent. Mixtures of cotton and rayon fibers can be dyed, and the present dyes also can be used to dye purified wood pulp and paper. Excluded herein as the water swellable cellulosic material is cellulose acetate which does not exhibit the requisite swellability in the presence of water.

The synthetic materials which can be dyed with the dyes of this invention include polyesters, polyamides, cellulose ethers and esters, and copolymers and mixtures thereof with other components intended to make them more easily dyeable or to add other desirable properties. The dyes can be applied to synthetic materials by conventional procedures, such as the Thermosol or aqueous dyeing procedures.

They can be applied to water swellable cellulosic materials, or to blends or mixtures thereof with synthetic materials by the above-described Blackwell et al. process. The dyes of this invention are particularly useful for dyeing mixtures and blends of cotton and polyester or polyamide, such as mixtures containing 65 to 80% polyethylene terephthalate and 20 to 35% cotton. In such mixtures, the synthetic material is dyed using conventional process conditions. Since the dyes of this invention can be used to dye both components in a blend or mixture, scourability as a factor in dye selection is avoided since the previously described cross-staining problem has been minimized.

The dyes of this invention dye the substrate directly, that is, they do not require oxidation, reduction, hydrolysis, or any other chemical modification for development of color or fastness. The dyes exhibit excellent fastness to light, crocking, washing, sublimation and drycleaning; they can be isolated in highly crystalline form and can be milled easily to fine aqueous dispersions.

In dyeing cellulosic materials with the dyes of this invention using the Blackwell et al. process, water, dye, and dye solvent can be applied to the substrate in any sequence as long as water and dye solvent are simultaneously present at some stage which is either before or simultaneous with actual dyeing. The preferred method for dyeing fabrics composed of cellulosic fibers or mixtures of cellulosic and synthetic fibers is to impregnate the fabric with a mixture of one or more dyes, water, and dye solvent in a conventional dye pad bath followed by squeezing to remove excess dye liquor, or to print with a solvent-containing printing paste, and subsequently heating to evaporate sufficient water to effect dissolution of the dye, at which time the fabric is dyed. Alternatively, water is evaporated, but in an insufficient amount to effect dissolution of the dye, after which pressure and heat are applied to effect dissolution without further evaporation of water. Dye pastes can be prepared by conventional techniques such as by milling the dye in the presence of a dispersing agent or surfactant. A dye bath can be prepared by diluting the dye paste with water or with aqueous solvent. Addition of a solvent to the dye paste before addition of water may cause dye separation and usually is avoided. It will be understood by those skilled in the art that additives other than a dye solvent and a dispersing agent can be present in dye baths. Such additives frequently include migration inhibitors such as purified vegetable gums and wetting agents, examples of which are ionic and nonionic surfactants such as ethylene oxide condensation products, hydrocarbon sulfonates and long-chain alcohol sulfates. Dye baths used in practicing this invention also can contain dyes other than those of this invention; for example, direct dyes or fiber reactive dyes for cotton or for polyamides can be present for shading purposes.

In the preferred dyeing procedure with the dyes of this invention, an aqueous dye dispersion and the organic solvent are applied to the fabric from a single padbath. The amount of water in the padbath usually is 70–95 weight percent and the solvent, 5–30 weight percent. The padded fabric is heated at 180–225° C. for 30–180 seconds. For cotton, temperatures as low as 150° C. usually are adequate. The dyed fabric generally is given an aqueous scour, or an aqueous scour followed by a perchloroethylene scour, to ensure complete removal of surface dye.

The following experiments show the utility of the dyes of this invention.

Dyeing 65/35 "Dacron" polyester/cotton blend fabric (A) A padbath was prepared from:

| | Grams |
|---|---|
| An aqueous orange dye paste (15% active ingredient) containing the dye of Example 1 | 50 |
| Purified vegetable gum thickener | 20 |
| Methoxypolyethylene glycol (molecular weight 350) | 100 |
| Water to 1 ilter. | |

A continuous length of 65/35 "Dacron" polyester/cotton fabric was padded at 60% uptake, based on the weight of the fiber, and the padded fabric was passed at a rate of 2 yards per minute between two 1,000 watt infrared lamps (Fostoria-Fannon, Inc., Infrared Heater Model 6624), with each lamp shining on opposite surfaces of the fabric from a distance of about 3 inches. The continuously moving fabric was passed through a circulating air oven at 80–100° C., with a hold-up time of one minute, and then through an oven at 200–210° C. with a hold-up time of 1.7 minutes. The hot, dry fabric was cooled to room temperature and rinsed for one minute each in sequence: in water at 20–30° C., in water at 90–95° C., at 90–95° C.

in water containing 1% of an ether-alcohol sulfate detergent, in water at 90–95° C., and in water at 20–30° C. The material was dried and then scoured for 5 minutes in perchloroethylene at 50° C. Uniform deep orange shades of good fastness were produced.

(B) Experiment A was repeated except that the heating was carried out as follows. The padded fabric was passed at a rate of 2 yards per minute between banks of infrared lamps, with one 1,000 watt lamp (Fostoria-Fannon, Inc., Infrared Heater Model 6624) shining on each surface perpendicular to the fabric from a distance of about 3 inches. The moist fabric was then passed over a series of four revolving smooth-surfaced drums increasing stepwise in temperature from 100° C. to about 150° C. The average contact time on each drum was about 18 seconds. Next, the fabric moved continuously into an oven held at about 210° C. where the total contact time was about 90 seconds.

(C) Experiment A was repeated except that the dye of Example 2 was employed. The polyester-cotton blend fabric was uniformly dyed a deep red shade of good fastness.

(D) Experiment C was repeated except that the heating was carried out as in Experiment B.

Dyeing cotton broadcloth (E) Experiment A was repeated except that a 100% mercerized cotton broadcloth was employed, the amount of glycol was increased to 150 grams, and the maximum temperature was reduced to about 180° C. The cotton cloth was dyed a deep, uniform orange shade of good fastness.

(F) Experiment B was repeated, employing the modifications recited in Experiment E.

Printing of 100% cotton fabric (G) A cotton fabric was padded to about 70% pickup with an aqueous solution containing 200 grams per liter of polyethylene glycol (M.W. 600). The padded fabric was heated at 160° C. for 5 minutes to evaporate water. The fabric was then printed in a pattern with a print paste prepared from:

| | Grams |
|---|---|
| An aqueous red paste (15% active ingredient) containing the dye of Example 3 | 10 |
| Purified natural gum ether thickener | 60 |
| Water | 30 |

The printed fabric was heated at 180° C. for 100 seconds, scoured in water containing an ether-alcohol sulfate detergent at about 90° C. for 5 minutes, dried, scoured in tetrachloroethylene at about 50° C. for 5 minutes and dried. The printed areas were strongly dyed in a bluish-red shade.

Printing of 65/35 "Dacron" polyester/cotton blend fabric (H) Experiment G was repeated except that a 65/35 "Dacron" polyester/cotton fabric was employed and the maximum temperature was increased to 200° C.

Dyeing of "Dacron" polyester

The dyes of this invention can be applied to synthetic fibers by conventional aqueous or pad-heat procedures. The following experiment shows the amenability of these dyes to the Thormosol process.

(I) "Dacron" polyester fabric was immersed for fifteen minutes at 180° F. in an aqueous bath containing 1% ether-alcohol sulfate surface active agent and 1% tetrasodium pyrophosphate. The fabric was rinsed in cold water, then padded at 90–100% pickup, based on dry fabric weight, in a dyebath containing:

| | Grams |
|---|---|
| An aqueous orange dye paste (15% active ingredient) containing the dye of Example 1 | 50 |
| Purified natural gum thickener | 20 |
| Water to 1 liter. | |

The padded material was passed through an infrared pre-dryer, then heated to and held at 415° F. for 90 seconds. The fabric was rinsed in water at 80° F., scoured for 5 minutes at 200° F. in water containing 1% ether-alcohol sulfate detergent, rinsed in water at 80° F. and dried. The polyester fabric was dyed a deep orange shade.

Fabric samples from Experiments A and C were evaluated for fastness using standard tests described in "Textile Manual of American Association of Textile Chemists and Colorists," vol. 45, 1969. The results are reported in the following table. The first three columns show the shade change of the dyed fabric, the next two show the degree of stain on an undyed acetate or nylon fabric, and the last shows the sublimation unto the undyed polyester/cotton fabric. The ratings are expressed with the following symbols:

5=negligible shade change
4=slight shade change
3=noticeable shade change
2=considerable shade change
1=much shade change
W=weaker
Br=brighter

TABLE 4

| Fabric | Lightfastness (xenon arc) | | Washfastness (AATCC 36-1965, No. III) | | | |
|---|---|---|---|---|---|---|
| | 20 hours | 40 hours | Shade change | Acetate | Nylon | Sublimation (410° F.) |
| Experiment A | 5-4 W | 4 W | 4 Br, W | 5-4 W | 4-3 W | 5 |
| Experiment C | 3 W | 3-2 W | 5-4 W | 5 | 5 | 5 |

The following examples illustrate the preparation of dyes of this invention. All parts are given by weight.

EXAMPLE 1

294 parts of 10 N-hydrochloric acid were added slowly, with stirring to 233 parts of aniline. Ice was added to cool the mass to 0° C., and 69 parts of powdered sodium nitrite were added rapidly. The temperature of the reaction mixture was held at 5° C. for ½ hour by external cooling and then allowed to rise to room temperature. After stirring the reaction mass at this temperature for 12 hours, the temperature was raised to 30° C. and held there for 4 hours, then to 40° C. for a further 4 hours. Sufficient 10 N-hydrochloric acid was then added to give a strongly acidic reaction on Congo Red paper and the reaction mass was stirred for 1 hour. The phenylazoaniline hydrochloride was isolated by filtration and washed thoroughly with 1 N-hydrochloric acid to remove excess aniline. Yield: 75% (based on the sodium nitrite added).

59 parts (dry weight) of the phenylazoaniline hydrochloride wet cake, 480 parts of water and 57 parts of 10 N-hydrochloric acid were stirred until a smooth slurry was obtained. Next, 68 parts of 5 N-sodium nitrite solution were added slowly and the reaction mixture was stirred for 1 hour at 20–25° C. Excess nitrous acid was destroyed by adding a small amount of sulfamic acid. The diazo preparation was clarified by filtration and added, over a period of 1–2 hours at ambient temperature, to a stirred mixture containing 94 parts of N-phenyl-diethanolamine dibenzoate, 96 parts of sodium acetate trihydrate and 1450 parts of glacial acetic acid. After stirring for 4 hours, the product was isolated by filtration, washed with water and dried. The orange dye was chromatographically pure (eluent, benzene; substrate, silica gel coated glass) and had an absorptivity of 62.2 liters/gram/cm. at 482 m$\mu$ (in dimethylacetamide: water=4:1).

Analysis.—Calcd. for $C_{36}H_{31}O_4N_5$ (percent): C, 72.4; H, 5.2; N, 11.7. Found (percent): C, 72.4; H, 5.2; N, 11.8. Based on the above, the orange disperse dye had the structure

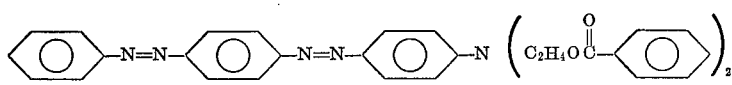

Deep orange shades of good fastness are produced on cotton or cotton-polyester blends when dyed or printed with this dye by the previously described procedures.

EXAMPLE 2

The monoazo intermediate was prepared from o-toluidine by essentially the same procedure described in Example 1.

53 parts of 10 N-hydrochloric acid were added to a smooth slurry of 47.4 parts of aminoazotoluene in 200 parts of acetic acid and 50 parts of water which had been precooled to 5° C. The resulting thick suspension was treated with 54 parts of 5 N-sodium nitrite solution while the temperature was maintained at 10° C. A positive nitrite test was maintained for 1 hour, after which excess nitrate was destroyed with sulfamic acid.

The diazo preparation was then added over a period of 1 hour to a solution of 102 parts of N-(m-benzamidophenyl)-diethanolamine dibenzoate and 36 parts of sodium acetate in 1200 parts of acetic acid which was precooled to 10° C. The pH was adjusted to 2 with additional sodium acetate and the reaction mass was stirred for 3 hours.

The product was isolated by filtration, washed thoroughly with water and dried. The red dye was chromatographically pure and had an absorptivity of 54.5 liters/gram/cm. at 500 m$\mu$.

*Analysis.*—Calcd. for $C_{45}H_{40}O_5N_6$ (percent): C, 72.6; H, 5.4; N, 11.3. Found (percent): C, 73.1; H, 5.0; N, 11.1. Based on the above, the red disperse dye had the structure

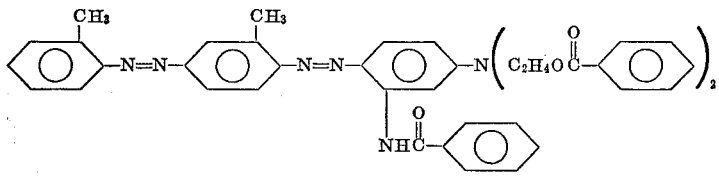

Deep red shades of good fastness are produced on cotton or cotton-polyester blend fabrics when dyed or printed with this dye by the previously described procedures.

EXAMPLE 3

A suspension of 75 parts of 3,4-dichloroaniline in 130 parts of 10 N-hydrochloric acid and 300 parts of water was heated with stirring to 75° C. to dissolve the amine. Ice was then added to adjust the temperature to 0°–5° C. and 106 parts of 5 N-sodium nitrite were added. Excess nitrite was maintained for ½ hour, after which the excess was destroyed with sulfamic acid. The diazo preparation was clarified by filtration and added over a period of 20 minutes to a solution of 50 parts of m-toluidine in 52 parts of 10 N-hydrochloric acid and 500 parts of water at room temperature. After stirring overnight, the red-brown solids were isolated by filtration. The wet cake was reslurried in 500 parts of warm water containing sufficient 30% caustic soda to give a pH in excess of 11. The solids turned reddish-yellow in shade. The product was isolated by filtration and washed with water until the washings were neutral.

A slurry of 28 parts (dry weight) of the monoazo intermediate in 225 parts of acetic acid, 100 parts of ice and 23 parts of 10 N-hydrochloric acid was treated with 245 parts of 5 N-sodium nitrite solution and stirred for 45 minutes. Excess nitrite was destroyed with sulfamic acid and the diazo preparation was added over ½ hour to a solution of 50 parts of N-(m-benzamidophenyl)-diethanolamine dibenzoate in 400 parts of acetone and 11 parts of 10 N-hydrochloric acid. The reaction mass was stirred for 4 hours and the pH was then raised to 2.5 with sodium acetate. After stirring overnight, the solids were separated by filtration. The dye was reslurried in a mixture of 250 parts of water and 200 parts of acetone, isolated, reslurried in 500 parts of 1 N-sodium carbonate solution, isolated, washed with water until alkali free and dried. Finally, the solids were recrystallized from acetone. The dye melted at 146–148° C. and had an absorptivity of 53.4 liters/gram/cm. at 515 m$\mu$.

*Analysis.*—Calcd. for $C_{44}H_{36}O_5N_6Cl_2$ (percent): C, 66.1; H, 4.5; N, 10.5. Found (percent): C, 65.7; H, 4.5; N, 10.3. Based on the above, the blue-red dye had the structure

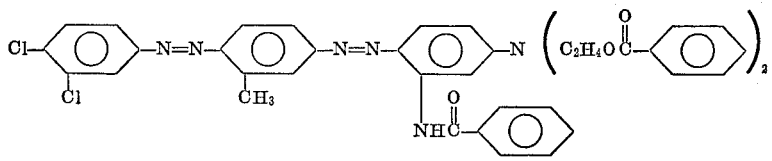

Deep blue-red shades of good fastness are produced when cotton and cotton-polyester blends are dyed or printed with this dye by the previously described procedures.

EXAMPLE 4

To a mixture of 200 parts of water and 52 parts of 10 N-hydrochloric acid, warmed to 50° C., were added 72 parts of α-naphthylamine. The mixture was heated to 80° C. with stirring and the resultant solution was added to 1750 parts of ice and 160 parts of water.

To this preparation was added a solution of 46.5 parts of aniline which had been diazotized at 0°–5° C. by conventional means in dilute hydrochloric acid. The pH was adjusted to 3.7 with 50 parts of sodium formate and the reaction mixture was stirred for 3 hours. The pH was then adjusted to 2 with 10 N-hydrochloric acid and the product was separated by filtration. The cake was recrystallized from ethanol, yielding 84 parts of the monoazo intermediate.

To a slurry of 24.7 parts of the monoazo intermediate in 90 parts of acetic acid, 100 parts of ice and 29 parts of 10 N-hydrochloric acid were added 24.5 parts of 5 N-sodium nitrite. The diazo preparation was clarified by filtration and excess nitrite was decomposed with sulfamic acid.

The diazo preparation was added over a period of 30 minutes to a pre-cooled (15° C.) solution of 38.9 parts of N-phenyl-diethanolamine dibenzoate in 240 parts of acetone and 180 parts of acetic acid. The reaction mixture was stirred overnight and the product was then isolated by filtration. The wet cake was reslurried in a 1:1:1 mixture of acetone, acetic acid and water and the product again was isolated by filtration. The wet cake was washed thoroughly with water and recrystallized from pyridine. The dye was chromatographically pure. Based on the above, the bluish-red dye had the structure

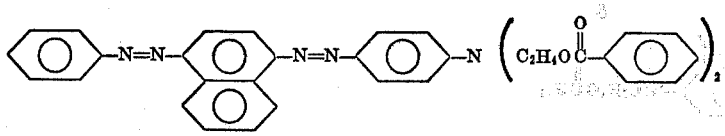

Deep bluish-red shades of excellent wash and sublimation fastness are produced on cotton and cotton-polyester blend fabrics when dyed or printed with this dye by the previously described procedures.

EXAMPLES 5–34

Examples of other dyes of this invention, and which have been prepared by procedures similar to those described above, are represented in Table 5. For simplification, only the reactants are shown. In Table 5, $ArA_1$ is the first aromatic amine which is coupled to a second aromatic amine $ArA_2$ and thence to a third aromatic amine

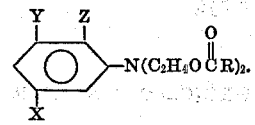

As to the last amine, only X, Y and R, all previously defined, are identified in the table. Table 5 also includes the shade of the dye on cotton-polyester blend fabric. Fastness to light, washing and sublimation on cotton-polyester blend fabrics is generally good.

TABLE 5

| Ex. No. | $ArA_1$ | $ArA_2$ | X | Y | R | Shade on cotton-polyester blends |
|---|---|---|---|---|---|---|
| 5 | Aniline | Aniline | $CH_3$ | H | $C_6H_5$ | Red-orange. |
| 6 | o-Toluidine | o-Toluidine | H | H | $C_6H_5$ | Orange. |
| 7 | do | do | $CH_3$ | H | $C_6H_5$ | Red-orange. |
| 8 | Aniline | Aniline | $NHCOC_6H_5$ | H | $C_6H_5$ | Scarlet. |
| 9 | o-Toluidine | o-Toluidine | $NHCOCH_3$ | H | $C_6H_5$ | Red. |
| 10 | Aniline | 2,5-xylidine | H | H | $C_6H_5$ | Orange. |
| 11 | do | do | $NHCOC_6H_5$ | H | $C_6H_5$ | Bluish-red. |
| 12 | p-Chloroaniline | m-Toluidine | H | H | $C_6H_5$ | Orange. |
| 13 | do | do | $NHCOC_6H_5$ | H | $C_6H_5$ | Bluish-red. |
| 14 | 3,4-dichloroaniline | m-Toluidine | H | H | $C_6H_5$ | Orange. |
| 15 | do | do | $NHCOC_6H_5$ | H | $C_6H_5$ | Bluish-red. |
| 16 | 5-chloro-o-toluidine | 2,5-dimethoxyaniline | H | H | $C_6H_5$ | Orange. |
| 17 | p-Bromoaniline | o-Anisidine | $NHCOC_8H_{17}$ | H | $C_6H_5$ | Red. |
| 18 | Aniline | Aniline | $NHCO-\langle\bigcirc\rangle-t.butyl$ | $CH_3$ | $C_6H_5$ | Red. |
| 19 | p-Butylaniline | Cresidine | $CH_3$ | H | $C_6H_5$ | Scarlet. |
| 20 | Aniline | Aniline | Cl | H | $C_6H_5$ | Orange. |
| 21 | 2,4-dichloroaniline | Cresidine | $NHCOCH_3$ | $OCH_3$ | $C_6H_5$ | Rubine. |
| 22 | Aniline | Aniline | H | H | $-\langle\bigcirc\rangle-CH_3$ (with $CH_3$) | Orange. |
| 23 | do | do | $NHCOCH_3$ | H | $C_6H_5$ | Red. |
| 24 | p-Toluidine | α-Naphthylamine | $CH_3$ | H | $C_6H_5$ | Rubine. |
| 25 | p-Cyanoaniline | m-Toluidine | H | H | $C_6H_5$ | Red. |
| 26 | p-Aminobenzophenone | do | H | H | $C_6H_5$ | Red. |
| 27 | p-Cyanoaniline | do | $NHCOC_6H_5$ | H | $C_6H_5$ | Bluish-red. |
| 28 | p-Aminobenzoic acid, ethyl ester | do | H | H | $C_6H_5$ | Red. |
| 29 | m-Aminobenzoic acid, N,N-diethyl-amide | m-Chloroaniline | H | H | $C_6H_5$ | Red. |
| 30 | 2-amino-5-chlorobenzotrifluoride | m-Toluidine | $NHCO-\langle\bigcirc\rangle-NO_2$ | $OC_4H_9$ | $-\langle\bigcirc\rangle-Cl$ | Rubine. |
| 31 | 2,4-dibromoaniline | 2,5-diethylaniline | $NHCOC_6H_5$ | H | $-\langle\bigcirc\rangle-OC_4H_9$ | Bluish-red. |
| 32 | m-Aminobenzoic acid, cyclohexyl ester | α-Naphthylamine | $C_4H_9$ | $C_4H_9$ | $-\langle\bigcirc\rangle-NO_2$ | Rubine. |
| 33 | 4-chloroanthranilic acid, butyl ester | m-Toluidine | $NHCO-\langle\bigcirc\rangle-C_4H_9$ | H | $C_6H_5$ | Bluish-red. |
| 34 | p-Aminobenzoic acid, N,N-dibutyl-amide | 2,5-diethoxyaniline | $NHCO-\langle\bigcirc\rangle-Cl$ (with Cl) | H | $C_6H_5$ | Rubine. |

The embodiments of the invention in which an exclusive property or privilege is claimed are defined as follows:

1. Orange to rubine disperse disazo dye having the formula

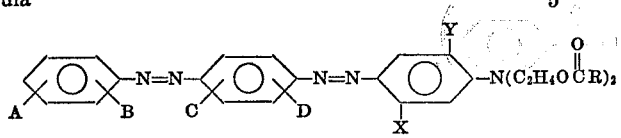

wherein

R is phenyl or phenyl with up to two substituents selected from $C_{1-4}$ alkyl, $C_{1-4}$ alkoxy, $NO_2$ and Cl;
X is H, Cl, $C_{1-4}$ alkyl,

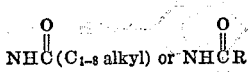

wherein R is as defined above;
Y is H, $C_{1-4}$ alkyl or $C_{1-4}$ alkoxy;
A is H, Cl, Br or $C_{1-4}$ alkyl;
B is H, Cl, Br, $CF_3$, CN, $C_{1-4}$ alkyl, $\overset{O}{\overset{\|}{C}}$—phenol, $\overset{O}{\overset{\|}{C}}N(C_{1-4}\ alkyl)(C_{1-4}\ alkyl)$, $\overset{O}{\overset{\|}{C}}O(C_{1-4}\ alkyl)$ or $\overset{O}{\overset{\|}{C}}O$—Cyclohexyl;

C and D jointly are CH=CH—CH=CH or C is H, $C_{1-2}$ alkyl or $C_{1-2}$ alkoxy and D is H, Cl, $C_{1-2}$ alkyl or $C_{1-2}$ alkoxy.

2.

3.

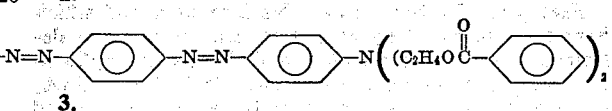

4.

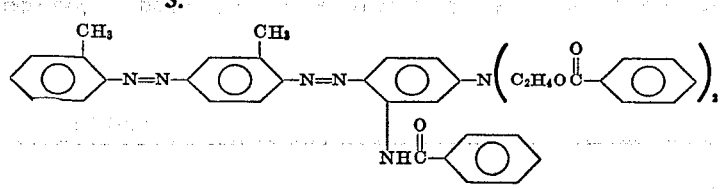

5.

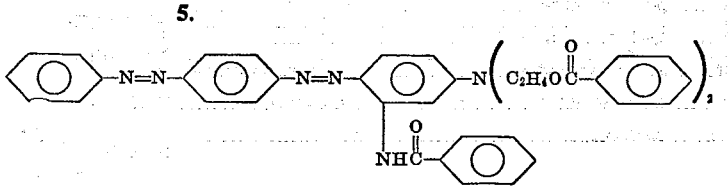

References Cited
UNITED STATES PATENTS
3,523,936  8/1970  Toji ............ 260—187

FLOYD D. HIGEL, Primary Examiner

U.S. Cl. X.R.

8—41 C, 50; 260—178, 184, 192, 196, 205, 206, 207.1, 477